US006785631B2

(12) United States Patent
Steinlechner et al.

(10) Patent No.: US 6,785,631 B2
(45) Date of Patent: Aug. 31, 2004

(54) METHOD AND DEVICE FOR ESTIMATING MOVEMENT PARAMETERS OF TARGETS

(75) Inventors: Siegbert Steinlechner, Leonberg (DE); Michael Schlick, Leonberg (DE); Juergen Hoetzel, Florstadt (DE); Thomas Brosche, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/221,082

(22) PCT Filed: Dec. 22, 2001

(86) PCT No.: PCT/DE01/04912

§ 371 (c)(1), (2), (4) Date: Jan. 24, 2003

(87) PCT Pub. No.: WO02/054369

PCT Pub. Date: Jul. 11, 2002

(65) Prior Publication Data

US 2003/0163280 A1 Aug. 28, 2003

(30) Foreign Application Priority Data

Jan. 8, 2001 (DE) ........................................ 101 00 413

(51) Int. Cl.[7] ................................................ G06F 15/00
(52) U.S. Cl. ........................................................ 702/141
(58) Field of Search ................................ 702/141, 121; 701/93, 301, 300, 455; 340/905, 454, 41, 436; 180/167

(56) References Cited

U.S. PATENT DOCUMENTS 5,600,561 A 2/1997 Okamura
6,014,601 A 1/2000 Gustafson
6,275,773 B1 * 8/2001 Lemelson et al. .......... 701/301
6,292,752 B1 * 9/2001 Franke et al. ............... 701/300
6,487,500 B2 * 11/2002 Lemelson et al. .......... 701/301

FOREIGN PATENT DOCUMENTS

| | | |
|---|---|---|
| EP | 1 035 533 | 9/2000 |
| JP | 08 124100 | 5/1996 |
| JP | 2000 057499 | 2/2000 |

OTHER PUBLICATIONS

G. Grosche, V. Ziegler, D. Ziegler, Supplementary Chapter to I. N. Bronstein, K. A. Semendjajew, Taschenbuch der Mathematik (Handbook of Mathematics), 6th edition, B. G. Teubner, Verlagsgesellschaft Leipzig, 1979.**
Patent Abstracts of Japan, vol. 2000, No. 05, Sep. 14, 2000.*
Patent Abstracts of Japan, vol. 1996, No. 09, Sep. 30, 1996.*

* cited by examiner

*Primary Examiner*—Kamini Shah
*Assistant Examiner*—Tung Lau
(74) *Attorney, Agent, or Firm*—Kenyon & Kenyon

(57) ABSTRACT

A device for outputting parameter values and a method of providing parameter values which pertain to the relative kinematic behavior of an object, in particular a first vehicle, and a target object, in particular a second vehicle, a conclusion is drawn based on the parameter values as to whether the object and the target object will probably collide. The method involves providing a sensor system on the object, the sensor system being provided for transmitting and receiving signals to determine measured values $r_i$, $v_{r,i}$ for target object distance r and/or for relative radial velocity $v_r$ between the object and the target object, determining measured values $r_i$, $v_{r,i}$ and analyzing measured values $r_i$, $v_{r,i}$ thus determined and providing the parameter values based on the signals received by a receiver.

20 Claims, 1 Drawing Sheet

METHOD AND DEVICE FOR ESTIMATING MOVEMENT PARAMETERS OF TARGETS

FIELD OF THE INVENTION

The present invention relates to a method of providing parameter values pertaining to the relative kinematic behavior of an object, in particular a first vehicle, and a target object, in particular a second vehicle, a conclusion being reached on the basis of these parameter values as to whether the object and the target object will presumably collide. This method includes the following steps:

a) providing a sensor system on the object, the sensor system being provided for transmitting and receiving signals in order to detect measured values $r_i$, $v_{r,i}$ for target object distance r and/or for relative radial velocity $v_r$ of the target object, b) determining measured values $r_i$, $v_{r,i}$ and c) analyzing measured values $r_i$, $v_{r,i}$ thus determined and providing the parameter values.

The present invention also relates to a device for outputting parameter values pertaining to the relative kinematic behavior of an object, in particular a first vehicle, and a target object, in particular a second vehicle, so that on the basis of these parameter values, a conclusion is reached as to whether the object and the target object will presumably collide. This device includes a sensor system arranged on the object, the sensor system being provided to transmit and receive signals, to determine measured values $r_i$, $v_{r,i}$ for target object distance r and/or relative radial velocity $v_r$ of the target object, and an arrangement for analyzing measured values $r_i$, $v_{r,i}$ determined by the sensor system and outputting the parameter values.

BACKGROUND INFORMATION

In the field of automotive engineering, for example, methods of providing and/or devices for outputting parameter values which pertain to and/or describe the relative kinematic behavior of a first vehicle and a second vehicle and/or any obstacle may be necessary to reach a conclusion regarding a collision or to detect a dead angle with the help of these parameter values. To this end, sensors such as optical sensors, capacitive sensors, ultrasonic sensors or radar sensors are used to measure distance r between the vehicles, and/or relative radial velocity $v_r$ of the second vehicle within a range to be monitored.

It is believed to be known that by differentiation of the radial velocity, the radial component of relative radial acceleration $a_r$ of the second vehicle may be determined from these measured values. In addition, it is also believed to be known that the radial velocity may be determined, for example, by analyzing the Doppler frequency or by differentiation of the distance. According to other systems, the normal components of the distance, of the velocity, and of the acceleration perpendicular to the front area of the vehicle may be calculated by triangulation from the measured values of several spatially distributed sensors.

For triangulation, it may be necessary to include multiple transmitting and/or receiving units and/or sensors distributed spatially, and this entails high hardware costs. Another problem that may occur with other systems is that even when using multiple sensors, under some circumstances, only one sensor will receive a signal suitable for analysis. In this case, triangulation may not be performed, so that an imminent collision may not be detected.

SUMMARY OF THE INVENTION

Due to the fact that step c) of the exemplary method according to the present invention is implementable on the basis of signals received by only one receiver, i.e., no triangulation is performed, the hardware cost may be reduced and reliable predictions may be made even if only one sensor receives a signal suitable for use for a corresponding analysis.

The same thing is also true of the exemplary device according to the present invention in which the arrangement performs the analysis on the basis of the signals received by only one receiver assigned to the sensor system.

DETAILED DESCRIPTION

Figure 1:
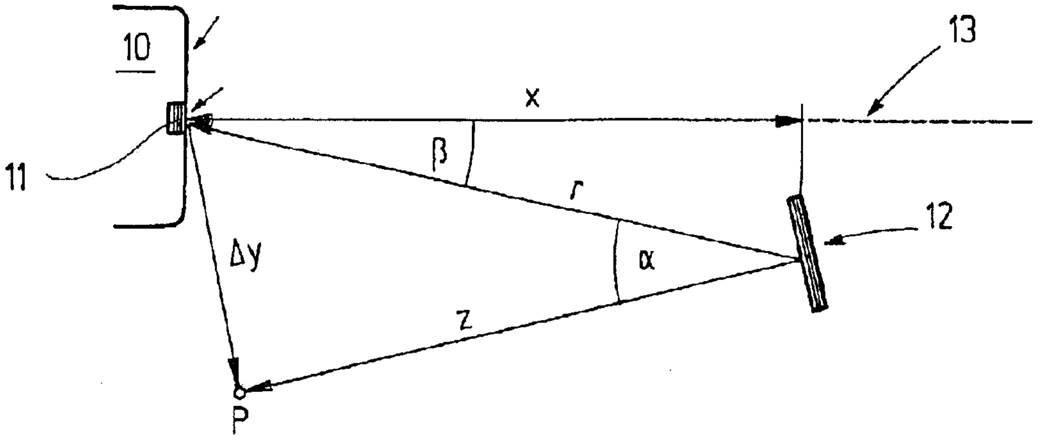
FIG. 1 shows a geometric representation of the object and the target object.

FIG. 1 shows an object in the form of a first vehicle, labeled on the whole with reference number 10. A sensor system is arranged on first vehicle 10. The normal to the front area of first vehicle 10 is labeled as 13. A target object in the form of a second vehicle is labeled on the whole with reference number 12. On the whole, FIG. 1 illustrates the case of one vehicle driving by another, i.e., there is no collision. The distance between first vehicle 10 and second vehicle 12 is characterized by a vector r whose component normal to the front area of first vehicle 10 is labeled as x. An angle $\beta$ is formed between vectors r and x. When second vehicle is at point P, the offset between first vehicle 10 and second vehicle 12 is $\Delta y$, the initial distance between point P and second vehicle 12 being characterized by vector z.

On the basis of offset $\Delta y$, it may be detected whether the vehicle will pass by or a collision is imminent. Offset $\Delta y$ is in this case assumed to lie in the horizontal plane (azimuth). It is expedient here to measure with a small angle in the vertical direction (elevation). For example, if the height of the target object, i.e., the offset in the vertical direction, is to be determined, then a small angle in the azimuth is suitable. Measurement of the offset in a plane with any desired inclination to the horizontal or vertical plane is also allowed by using a suitably shallow antenna diagram. If the offset is measured in two planes orthogonal to one another (e.g., elevation and azimuth), then the target coordinates in the space monitored are determined unambiguously by target object distance r.

Figure 2:
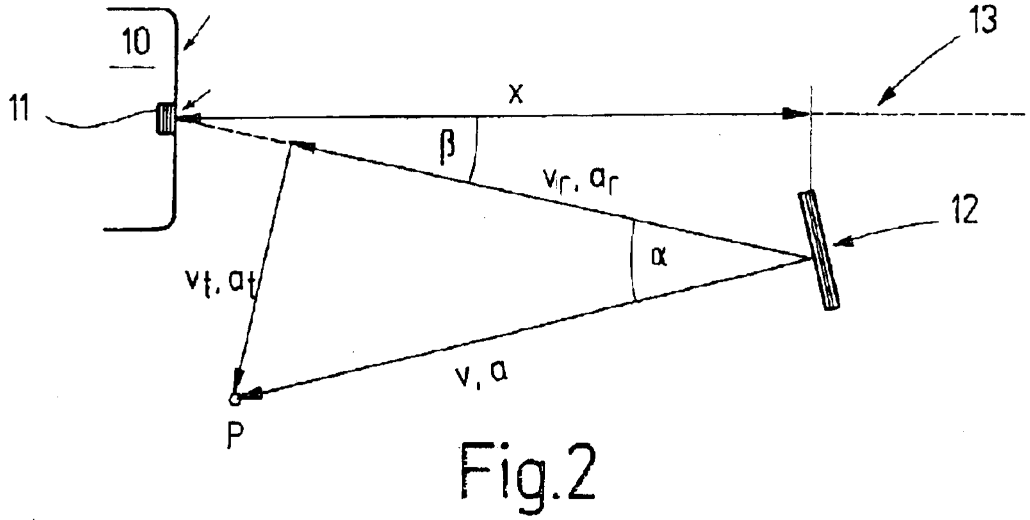
FIG. 2 shows a representation of the various parameters.

FIG. 2 illustrates a few important parameters. The initial position of first vehicle 10 and of second vehicle 12 corresponds to that in FIG. 1. The vector arrows in FIG. 2 indicate the kinematic behavior of second vehicle 12. In practice, however, both first vehicle 10 and second vehicle 12 are moving or the target object is not a second vehicle but instead is a stationary target object. Therefore, relative variables are referred to here as were in the preceding description.

Vectors $v_r$ and $a_r$ denote the relative radial velocity and the radial acceleration, respectively of second vehicle 12. Vectors v and a denote the relative velocity and relative acceleration, respectively, of second vehicle 12, an angle $\alpha$ being formed between vectors $v_r$ and v, i.e., $a_r$ and a. The tangential components of relative radial velocity $v_r$ perpendicular to the radial component or relative radial acceleration $a_r$ of the second vehicle are given as $v_t$ and $a_t$, respectively, point P being defined by vectors $v_t$ and $a_t$ or v and a.

Without constituting a restriction, the parameter values pertain to one or more of the following parameters: the relative acceleration a of the target object, relative velocity v of the target object, relative radial velocity $v_r$ of the target object, offset $\Delta y$ between the object and the target object, angle $\alpha$ between the vectors of the relative velocity v of the target object and relative radial velocity $v_r$ of the target object i.e., between the vectors of relative acceleration a of the target object and relative radial acceleration $a_r$ of the target object. The parameter values for some of these parameters are estimated on the basis of the available measured values, and the parameter values for other parameters are determined on the basis of the estimated parameter values.

To this end, a vector $\vec{p}$ is used, containing at least some of the parameters being sought, this vector $\vec{p}$ optionally having the form:

$$\vec{p}=[a, v_0, \alpha_0$$

where a denotes the relative acceleration of the target object, $v_0$ denotes the relative initial velocity of the target object in the first measurement in the first repetition, and $\alpha_0$ is the angle between the vectors of relative velocity v of the target object and relative radial velocity $v_r$ of the target object, i.e., the angle between the vectors of relative acceleration a of the target object and relative radial acceleration $a_r$ of the target object in the first measurement. The first measurement refers to the first measurement of a plurality of measurements performed at different points in time $t_i$, where i=1, 2, . . . Points in time $t_i$ may be equidistant but need not be. For example, measured values at equidistant target distances may also be detected.

According to a first exemplary embodiment of the present invention, target object distances $r_i$ are measured at different points in time $t_i$ and target object distance r is described by the equation:

$$r = f(\vec{p}, t) = \sqrt{(r_0\cos(\alpha_0) + v_0 t + at^2/2)^2 + (r_0\sin(\alpha_0))^2}$$

where $r_0$ is the target object distance in the first measurement, $v_0$ is the relative initial velocity of the target object in the first measurement in the first repetition, a is the relative acceleration of the target object, t is the time and $\alpha_0$ is the angle between the vectors of relative velocity v of the target object and relative radial velocity $v_r$ of the target object, i.e., the angle between the vectors of relative acceleration a of the target object and relative radial acceleration $a_r$ of the target object in the first measurement.

In particular, in this exemplary embodiment, the parameter values for the parameters contained in vector $\vec{p}$ may be estimated based on a norm to be explained below. The estimation may also be performed with the help of values $t_i$, $r_i^2$ after squaring the equation given above.

According to a second exemplary embodiment of the present invention, relative radial velocities $v_{r,i}$ are measured at different points in time $t_i$, and relative radial velocity $v_r$ of the target object is described by the equation:

$$v_r = f(\vec{p}, t) = \frac{(v_0 + at)(r_0\cos(\alpha_0) + v_0 t + at^2/2)}{\sqrt{(r_0\cos(\alpha_0) + v_0 t + at^2/2)^2 + (r_0\sin(\alpha_0))^2}}$$

Parameters $r_0$, $v_0$, a, t and $\alpha_0$ correspond to the parameters of the first exemplary embodiment.

According to a third exemplary embodiment of the present invention, target object distances $r_i$ and relative radial velocities of $v_{r,i}$ are measured at different points in time $t_i$ and relative radial velocity $v_r$ of the target object is described by the equation:

$$v_r = f(\vec{p}, t, r) = \frac{(v_0 + at)(r_0\cos(\alpha_0) + v_0 t + at^2/2)}{r}$$

Here again, parameters $r_0$, $v_0$, a, t and $\alpha_0$ correspond to the parameters in the first exemplary embodiment.

The exemplary embodiments just described may optionally be combined in a suitable manner or reformulated mathematically.

The norm theory on which the following description is based is known. For further details, reference is made to G. Grosche, V. Ziegler, D. Ziegler: Supplementary chapter to I. N. Bronstein, K. A. Semendjajew, Taschenbuch der Mathematik Handbook of Mathematics, $6^{th}$ edition, B. G. Teubner, Verlagsgcsellschaft Leipzig, 1979, which is hereby incorporated by reference.

To estimate the parameter values, a norm $Q(\vec{p})$ is defined a follows in conjunction with the first exemplary embodiment:

$$Q(\vec{p})=Q_1(\vec{p})=\|r_i^k-f^k(\vec{p}, t_i)\|, \text{ where k=1 or k=2}$$

where k=1 or k=2.

An example of the definition of norm $Q(\vec{p})$ may have the following form in conjunction with the first exemplary embodiment:

$$Q(\vec{p}) = Q_{11}(\vec{p}) = \sum_i (r_i^k - f^k(\vec{p}, t_i))^2, \text{ where } k = 1 \text{ or } k = 2$$

where k=1 or k=2.

Another example of the definition of the norm $Q(\vec{p})$ may provide the following form in conjunction with the first exemplary embodiment:

$$Q(\vec{p})=Q_{12}(\vec{p})=\max(|r_i^k-f^k(\vec{p}, t_i)|), \text{ where k=1 or k=2}$$

where k=1or k=2.

To estimate the parameter values, a norm $Q(\vec{p})$ is defined as follows in conjunction with the second exemplary embodiment:

$$Q(\vec{p})=Q_2(\vec{p})=\|v_i^k-f^k(\vec{p}, t_i)\|, \text{ where k=1 or k=2}$$

where k=1 or k=2.

An example of the definition of the norm $Q(\vec{p})$ may provide the following form in conjunction with the second exemplary embodiment:

$$Q(\vec{p}) = Q_{21}(\vec{p}) = \sum_i (v_i^k - f^k(\vec{p}, t_i))^2, \text{ where } k = 1 \text{ or } k = 2$$

where k=1 or k=2.

Another example of the definition of norm $Q(\vec{p})$ may provide the following form in conjunction with the second exemplary embodiment:

$$Q(\vec{p})=Q_{22}(\vec{p})=\max(|v_i^k-f^k(\vec{p}, t_i)|), \text{ where k=1 or k=2}$$

where k=1 or k=2.

To estimate the parameter values, a norm $Q(\vec{p})$ is defined as follows in conjunction with the third exemplary embodiment:

$$Q(\vec{p})=Q_3(\vec{p})=\|v_i^k-f^k(\vec{p},\ t_i,r_i)\|,\text{ where k=1 or k=2}$$

where k=1 or k=2.

An example of the definition of the norm $Q(\vec{p})$ may provide the following form in conjunction with the third exemplary embodiment:

$$Q(\overline{p})=Q_{31}(\overline{p})=\sum_i (v_i^k-f^k(\overline{p},t_i,r_i))^2,\text{ where } k=1 \text{ or } k=2$$

where k=1 or k=2.

Another example of the definition of the norm $Q(\vec{p})$ may provide the following form in conjunction with the third exemplary embodiment.

$$Q(\vec{p})=Q\mathbf{3}_{32}(\vec{p})=\max(|v_i^k-f^k(\vec{p},\ t_i,r_i)|),\text{ where k=1 or k=2}$$

where k=1 or k=2.

As mentioned above, the parameter values for the parameters contained in vector $\vec{p}$ are estimated on the basis of the measured values.

In this connection, the parameter values for the parameters contained in vector $\vec{p}$ are estimated on the basis of an optimization method using points in time $t_i$ and measured values $r_i$ for the target object distance and/or measured values $v_{r,i}$ for the relative radial velocity of the target object; this is done by determining the minimum of the norm $Q(\vec{p})$.

A suitable optimization method which may be used, for example, when the norm $Q(\vec{p})$ has the form:

$$Q(\overline{p})=Q_{11}(\overline{p})=\sum_i (r_i^k-f^k(\overline{p},t_i))^2,\text{ where } k=1 \text{ or } k=2,\text{ or}$$

$$Q(\overline{p})=Q_{21}(\overline{p})=\sum_i (v_i^k-f^k(\overline{p},t_i))^2,\text{ where } k=1 \text{ or } k=2,\text{ or}$$

$$Q(\overline{p})=Q_{31}(\overline{p})=\sum_i (v_i^k-f^k(\overline{p},t_i,r_i))^2,\text{ where } k=1 \text{ or } k=2$$

is the method of least error squares, which is well known.

In some cases, it may be assumed that relative acceleration a of the target object is constant and/or that acceleration vector $\vec{a}$ is parallel to velocity vector $\vec{v}$. Accordingly, then a linear variation of relative velocity v of the target object is assumed. In this connection, for example, it is assumed that the relative acceleration is a=0 m/s$^2$. In addition, it may be assumed that the relative velocity amounts to a=0 m/s$^2$ when relative velocity v is greater than a predetermined limiting value, and the relative acceleration is a=0 m/s$^2$ when relative velocity v is less than the previously determined limiting value.

When the estimated parameter values for the parameters contained in vector $\vec{p}$ are available, offset Δy between the object and the target object may be determined on the basis of the equation:

$$\Delta y=r_0\ \sin(\alpha_0.$$

In addition, instantaneous angle α(t) between the vectors of relative velocity v of the target object and relative radial velocity $v_r$ of the target object, i.e., between the vectors of relative acceleration a of the target object and relative radial acceleration $a_r$ of the target object may be determined from the estimated parameter values of the parameters contained in vector $\vec{p}$ and offset Δy between the object and the target object by using the equation:

$$\alpha(t)=a\tan\left(\frac{\Delta y}{r_0\cos(\alpha_0)+v_0t+at^2/2}\right).$$

The relative instantaneous velocity v(t) of the target object is determined by using the estimated parameter values of the parameters contained in vector $\vec{p}$ on the basis of the equation:

$$v(t)={}_0+at.$$

The absolute value of the relative instantaneous radial velocity of the target object may be determined from the estimated parameter values of the parameters contained in vector $\vec{p}$ by using the equation:

$$|v_r(t)|=|(v_0+at)\cos(\alpha).$$

When an angle between a normal of the object and the vector of target object distance r is equal to angle between the vectors of relative velocity v of the target object and relative radial velocity $v_r$ of the target object or between the vectors of relative acceleration a of the target object and relative radial acceleration $a_r$ of the target object, then the normal component relative to the object is $v_n$=v, $a_n$=a and x=r cos (α). In this case, time $t_1$ of a collision which may occur is determined from the estimated parameter values of the parameters contained in vector $\vec{p}$ by using the equation:

$$t_1=\frac{-\sqrt{v_0^2-2r_0a\cos(\alpha_0)}}{|a|}-\frac{v_0}{a}$$

When one vehicle drives by another, $t_1$ is the point in time having the shortest target distance at point P.

In addition an error factor $e(\vec{p})$ is defined using the estimated parameter values of the parameters contained in vector $\vec{p}$ by using the equation:

$$e_1(\vec{p})=\|r^k{}_i-f^k(p,t_i)\|,\text{ where k=1 or k=2, or}$$

$$e_2(\vec{p})=\|v^k{}_i-f^k(p,t_i)\|,\text{ where k=1 or k=2, or}$$

$$e_3(\vec{p})=\|v^k{}_i-f^k(p,t_i,r_i)\|,\text{ where k=1 or k=2}$$

Error factor $e(\vec{p})$ is provided to perform an error estimate for the estimated parameter values and/or for the parameter values derived from the estimated parameter values. Error factor $e(\vec{p})$ also allows for threshold values to be defined that may be adapted to the respective application, for example. When values are above or below these threshold values, the parameter values may be classified as invalid for individual parameters, for example.

What is claimed is:

1. A method of providing at least two parameter values pertaining to a relative kinematic behavior of an object and a target object, for which a conclusion is determinable based on the at least two parameter values as to whether the object and the target object will probably collide, the method comprising:

providing on the object a sensor system to transmit and receive a plurality of signals to determine at least two measured values for at least one of a distance and a relative radial velocity of the target object;

determining the at least two measured values;

analyzing the at least two measured values based on the plurality of signals received by a receiver; and providing the at least two parameter values based on analyzing the at least two measured values;

wherein a vector $\vec{p}$ contains the at least two parameter values and is of the form:

$$\vec{p}=[a,v_0,\alpha_0,$$

where a is a relative acceleration of the target object, $v_0$ is a relative initial velocity of the target object in a first measurement, and $\alpha_0$ is an angle between vectors of a relative velocity of the target object and the relative radial velocity of the target object, corresponding to an angle between vectors of the relative acceleration of the target object and a relative radial acceleration of the target object in the first measurement.

2. A method of providing at least two parameter values pertaining to a relative kinematic behavior of an object and a target object, for which a conclusion is determinable based on the at least two parameter values as to whether the object and the target object will probably collide, the method comprising:

providing on the object a sensor system to transmit and receive a plurality of signals to determine at least two measured values for at least one of a distance and a relative radial velocity of the target object;

determining the at least two measured values;

analyzing the at least two measured values based on the plurality of signals received by a receiver; and providing the at least two parameter values based on analyzing the at least two measured values;

wherein the at least two measured values are at least two target object distances that are measured at different points in time and the target object distance is described by the following equation:

$$r = f(\vec{p}, t) = \sqrt{(r_0 \cos(\alpha_0) + v_0 t + at^2/2)^2 + (r_0 \sin(\alpha_0))^2},$$

where $r_0$ is the target object distance in a first measurement, $v_0$ is a relative initial velocity of the target object in the first measurement, a is a relative acceleration of the target object, t is a time and $\alpha_0$ is an angle between vectors of a relative velocity of the target object and the relative radial velocity of the target object, corresponding to an angle between vectors of the relative acceleration of the target object and a relative radial acceleration of the target object in the first measurement.

3. A method of providing at least two parameter values pertaining to a relative kinematic behavior of an object and a target object, for which a conclusion is determinable based on the at least two parameter values as to whether the object and the target object will probably collide, the method comprising:

providing on the object a sensor system to transmit and receive a plurality of signals to determine at least two measured values for at least one of a distance and a relative radial velocity of the target object;

determining the at least two measured values;

analyzing the at least two measured values based on the plurality of signals received by a receiver; and providing the at least two parameter values based on analyzing the at least two measured values;

wherein the at least two measured values include at least two relative radial velocities of the target object that are measured at at least two different points in time and the relative radial velocity of the target object is described by the following equation:

$$v_r = f(\vec{p}, t) = \frac{(v_0 + at)(r_0\cos(\alpha_0) + v_0 t + at^2/2)}{\sqrt{(r_0\cos(\alpha_0) + v_0 t + at^2/2)^2 + (r_0\sin(\alpha_0))^2}},$$

where $r_0$ is the target object distance in a first measurement, $v_0$ is a relative initial velocity of the target object in the first measurement, a is a relative acceleration of the target object, t is a time and $\alpha_0$ is an angle between vectors of a relative velocity of the target object and the relative radial velocity of the target object, corresponding to an angle between vectors of the relative acceleration of the target object and a relative radial acceleration of the target object in the first measurement.

4. The method of claim 2, wherein in the at least two measured values include at least two target object distances and at least two relative radial velocities that are measured at at least two different points in time and the relative radial velocity of the target object is described by the following equation:

$$v_r = f(\vec{p}, t, r) = \frac{(v_0 + at)(r_0\cos(\alpha_0) + v_0 t + at^2/2}{r},$$

where $r_0$ is the target object distance in a first measurement, $v_0$ is a relative initial velocity of the target object in the first measurement, a is a relative acceleration of the target object, t is a time and $\alpha_0$ is an angle between vectors of a relative velocity of the target object and the relative radial velocity of the target object, corresponding to an angle between vectors of the relative acceleration of the target object and a relative radial acceleration of the target object in the first measurement.

5. A method of providing at least two parameter values pertaining to a relative kinematic behavior of an object and a target object, for which a conclusion is determinable based on the at least two parameter values as to whether the object and the target object will probably collide, the method comprising:

providing on the object a sensor system to transmit and receive a plurality of signals to determine at least two measured values for at least one of a distance and a relative radial velocity of the target object;

determining the at least two measured values;

analyzing the at least two measured values based on the plurality of signals received by a receiver; and providing the at least two parameter values based on analyzing the at least two measured values;

wherein for estimating the at least two parameter values, a norm $Q(\vec{p})$ is defined as follows:

$$Q(\vec{p})=Q_1(\vec{p})=\|r_i^k-f^k(\vec{p},t_i)\|, \text{ where k=1 or k=2, or}$$

$$Q(\vec{p})=Q_2(\vec{p})=\|v_i^k-f^k(\vec{p},t_i)\|, \text{ where k=1 or k=2, or}$$

$$Q(\vec{p})=Q_3(\vec{p})=\|v_i^k-f^k(\vec{p},t_i,r_i)\|, \text{ where k=1 or k=2.}$$

6. A device for outputting at least two parameter values pertaining to a relative kinematic behavior of an object and a target object, for which a conclusion is determinable based on the at least two parameter values as to whether the object and the target object will probably collide, the device comprising:

a sensor system arranged on the object to transmit and receive a plurality of signals to determine at least two measured values for at least one of a target object distance and a relative radial velocity of the target object; and an analyzing arrangement to analyze the at least two measured values determined by the sensor system and to output the at least two parameter values based on a plurality of signals received by only one receiver assigned to the sensor system;

wherein a vector $\vec{p}$ is provided for analyzing the at least two measured values determined by the sensor system, the vector $\vec{p}$ includes at least one of the at least two parameters and has the following form:

$$\vec{p}=[a,v_0,\alpha_0,$$

where a is a relative acceleration of the target object, $v_0$ is a relative initial velocity of the target object in a first measurement and $\alpha_0$ is an angle between vectors of a relative velocity of the target object and the relative radial velocity of the target object, corresponding to an angle between vectors of the relative acceleration of the target object and a relative radial acceleration of the target object in the first measurement.

7. A device for outputting at least two parameter values pertaining to a relative kinematic behavior of an object and a target object, for which a conclusion is determinable based on the at least two parameter values as to whether the object and the target object will probably collide, the device comprising:

a sensor system arranged on the object to transmit and receive a plurality of signals to determine at least two measured values for at least one of a target object distance and a relative radial velocity of the target object; and an analyzing arrangement to analyze the at least two measured values determined by the sensor system and to output the at least two parameter values based on a plurality of signals received by only one receiver assigned to the sensor system;

wherein the sensor system determines the at least two measured values for at least two target object distances at at least two different points in time and the analyzing arrangement analyzes the target object distance based on the following equation:

$$r=f(\vec{p},t)=\sqrt{(r_0\cos(\alpha_0)+v_0t+at^2/2)^2+(r_0\sin(\alpha_0))^2},$$

where $r_0$ is the target object distance in a first measurement, $v_0$ is a relative initial velocity of the target object in the first measurement, a is a relative acceleration of the target object, t is a time and $\alpha_0$ is an angle between vectors of a relative velocity of the target object and the relative radial velocity of the target object, corresponding to an angle between vectors of the relative acceleration of the target object and a relative radial acceleration of the target object in the first measurement.

8. A device for outputting at least two parameter values pertaining to a relative kinematic behavior of an object and a target object, for which a conclusion is determinable based on the at least two parameter values as to whether the object and the target object will probably collide, the device comprising:

a sensor system arranged on the object to transmit and receive a plurality of signals to determine at least two measured values for at least one of a target object distance and a relative radial velocity of the target object; and an analyzing arrangement to analyze the at least two measured values determined by the sensor system and to output the at least two parameter values based on a plurality of signals received by only one receiver assigned to the sensor system;

wherein the sensor system determines the at least two measured values for at least two relative radial velocities of the target object at at least two different points in time, and the analyzing arrangement analyzes the relative radial velocity of the target object by using the following equation:

$$v_r=f(\vec{p},t)=\frac{(v_0+at)(r_0\cos(\alpha_0)+v_0t+at^2/2)}{\sqrt{(r_0\cos(\alpha_0)+v_0t+at^2/2)^2+(r_0\sin(\alpha_0))^2}},$$

where $r_0$ is the target object distance in a first measurement, $v_0$ is a relative initial velocity of the target object in the first measurement, a is a relative acceleration of the target object, t is a time and $\alpha_0$ is an angle between vectors of a relative velocity of the target object and the relative radial velocity of the target object, corresponding to an angle between vectors of the relative acceleration of the target object and a relative radial acceleration of the target object in the first measurement.

9. A device for outputting at least two parameter values pertaining to a relative kinematic behavior of an object and a target object, for which a conclusion is determinable based on the at least two parameter values as to whether the object and the target object will probably collide, the device comprising:

a sensor system arranged on the object to transmit and receive a plurality of signals to determine at least two measured values for at least one of a target object distance and a relative radial velocity of the target object; and analyzing arrangement to analyze the at least two measured values determined by the sensor system and to output the at least two parameter values based on a plurality of signals received by only one receiver assigned to the sensor system;

wherein the analyzing arrangement defines a norm $Q(\vec{p})$ as follows:

$$Q(\vec{p})=Q_1(\vec{p})=\|r_i^k-f^k(\vec{p}, t_i)\|, \text{ where k=1 or k=2, or}$$

$$Q(\vec{p})=Q_2(\vec{p})=\|v_i^k-f^k(\vec{p}, t_i)\|, \text{ where k=1 or k=2, or}$$

$$Q(\vec{p})=Q_3(\vec{p})=\|v_i^k-f^k(\vec{p}, t_i,r_i)\|, \text{ where k=1 or k=2.}$$

10. The method of claims 1, 2, 3 or 5, wherein the object is a first vehicle and the target object is a second vehicle.

11. The method of claims 1, 2, 3 or 5, wherein the at least two parameter values pertain to at least one of a relative acceleration of the target object, a relative radial acceleration of the target object, a relative velocity of the target object, the relative radial velocity of the target object, an offset between the object and the target object, and an angle between vectors of a relative velocity of the target object and the relative radial velocity of the target object, corresponding to an angle between vectors of a relative acceleration of the target object and a relative radial acceleration of the target object.

12. The method of claim 1, wherein the at least two parameter values for parameters in the vector $\vec{p}$ are estimated based on the at least two measured values.

13. The method of claim 1, wherein the at least two parameter values for parameter values in the vector $\vec{p}$ are estimated based on at least two points in time and at least two measured values of at least one of at least two target object distances and at least two relative radial velocities by using an optimization method by determining a minimum of a norm $Q(\vec{p})$ defined as follows:

$$Q(\vec{p})=Q_1(\vec{p})=\|r_i^k-f^k(\vec{p}, t_i)\|, \text{ where k=1 or k=2, or}$$

$$Q(\vec{p})=Q_2(\vec{p})=\|v_i^k-f^k(\vec{p}, t_i)\|, \text{ where k=1 or k=2, or}$$

$$Q(\vec{p})=Q_3(\vec{p})=\|v_i^k-f^k(\vec{p}, t_i,r_i)\|, \text{ where k=1 or k=2.}$$

14. The method of claim 1, wherein the at least two parameter values for parameter values in the vector $\vec{p}$ are estimated based on at least two points in time and at least two measured values of at least one of at least two target object distances and at least two relative radial velocities by using an optimization method by determining a minimum of a norm $Q(\vec{p})$.

15. The device of claims 6, 7, 8 or 9, wherein the object is a first vehicle and the target object is a second vehicle.

16. The device of claims 6, 7, 8 or 9, wherein the at least two parameter values pertain to at least one of a relative acceleration of the target object, a relative radial acceleration of the target object, a relative velocity of the target object, the relative radial velocity of the target object, an offset between the object and the target object, an angle between vectors of the relative velocity of the target object and the relative radial velocity of the target object, corresponding to an angle between vectors of the relative acceleration of the target object and the relative radial acceleration of the target object.

17. The device of claim 6, wherein the analyzing arrangement estimates the at least two parameter values for the parameters of the vector $\vec{p}$ based on the at least two measured values.

18. The device of claim 6, wherein the analyzing arrangement estimates the at least two parameter values for the parameters in the vector $\vec{p}$ based on at least two points in time and at least one of at least two measured values for the target object distances and at least two measured values for at least two relative radial velocities by using an optimization method in which the analyzing arrangement determines a minimum of a norm $Q(\vec{p})$ defined as follows:

$$Q(\vec{p})=Q_1(\vec{p})=\|r_i^k-f^k(\vec{p}, t_i)\|, \text{ where k=1 or k=2, or}$$

$$Q(\vec{p})=Q_2(\vec{p})=\|v_i^k-f^k(\vec{p}, t_i)\|, \text{ where k=1 or k=2, or}$$

$$Q(\vec{p})=Q_3(\vec{p})=\|v_i^k-f^k(\vec{p}, t_i,r_i)\|, \text{ where k=1 or k=2.}$$

19. The device of claim 6, wherein the analyzing arrangement estimates the at least two parameter values for the parameters in the vector $\vec{p}$ based on at least two points in time and at least one of at least two measured values for the target object distances and at least two measured values for at least two relative radial velocities by using an optimization method in which the analyzing arrangement determines a minimum of a norm $Q(\vec{p})$.

20. The device of claim 7, wherein the sensor system determines the at least two measured values for at least two target object distances and for at least two relative radial velocities at at least two different points in time, and the analyzing arrangement analyzes the relative radial velocity of the target object by using the following equation:

$$v_r = f(\vec{p}, t, r) = \frac{(v_0 + at)(r_0\cos(\alpha_0) + v_0t + at^2/2}{r},$$

where $r_0$ is the target object distance in a first measurement, $v_0$ is a relative initial velocity of the target object in the first measurement, a is a relative acceleration of the target object, t is a time and $\alpha_0$ is an angle between vectors of a relative velocity of the target object and the relative radial velocity of the target object, corresponding to an, angle between vectors of the relative acceleration of the target object and a relative radial acceleration of the target object in the first measurement.

* * * * *

UNITED STATES PATENT AND TRADEMARK OFFICE

CERTIFICATE OF CORRECTION

PATENT NO. : 6,785,631 B2
DATED : August 31, 2004
INVENTOR(S) : Siegbert Steinlechner et al.

It is certified that error appears in the above-identified patent and that said Letters Patent is hereby corrected as shown below:

Column 4,
Line 20, change "Verlagsgcsellschaft" to -- Verlagsgesellschaft --.
Line 44, change "where k=1or k=2." to -- where k=1 or k=2 --.

Column 5,
Line 12, change "$Q(\bar{p}) = Q_{31}(\bar{p}) = \sum_i (v_i^k - f^k(\bar{p}, t_i, r_i))^2$, where k = 1 or k = 2"

to --$Q(\bar{p}) = Q_{31}(\bar{p}) = \sum_i (v_i^k - f^k(\bar{p}, t_i, r_i))^2$, where k = 1 or k = 2--

Lines 38-44, change "$Q(\bar{p}) = Q_{11}(\bar{p}) = \sum_i (r_i^k - f^k(\bar{p}, t_i))^2$, where k = 1 or k = 2, or $Q(\bar{p}) = Q_{21}(\bar{p}) = \sum_i (v_i^k - f^k(\bar{p}, t_i))^2$, where k = 1 or k = 2, or $Q(\bar{p}) = Q_{31}(\bar{p}) = \sum_i (v_i^k - f^k(\bar{p}, t_i, r_i))^2$, where k = 1 or k = 2"

to --$Q(\bar{p}) = Q_{11}(\bar{p}) = \sum_i (r_i^k - f^k(\bar{p}, t_i))^2$, where k = 1 or k = 2, or $Q(\bar{p}) = Q_{21}(\bar{p}) = \sum_i (v_i^k - f^k(\bar{p}, t_i))^2$, where k = 1 or k = 2, or $Q(\bar{p}) = Q_{31}(\bar{p}) = \sum_i (v_i^k - f^k(\bar{p}, t_i, r_i))^2$, where k = 1 or k = 2--

Column 6,
Line 26, change "to angle between" to -- to the angle between --.

Column 12,
Line 51, change "to an, angle" to -- to an angle --.

Signed and Sealed this

Thirtieth Day of August, 2005

JON W. DUDAS
*Director of the United States Patent and Trademark Office*